June 29, 1971 R. E. CLARK 3,589,880

PLURALITY OPTICAL ELEMENT PRESSING PROCESS

Original Filed Nov. 22, 1966

RICHARD E. CLARK
INVENTOR.

BY

ATTORNEYS

United States Patent Office 3,589,880
Patented June 29, 1971

3,589,880
PLURALITY OPTICAL ELEMENT PRESSING PROCESS

Richard E. Clark, Rochester, N.Y., assignor to Eastman Kodak Company, Rochester, N.Y.

Continuation of application Ser. No. 596,230, Nov. 22, 1966. This application Mar. 24, 1970, Ser. No. 20,463
Int. Cl. C03b *23/20*
U.S. Cl. 65—18 6 Claims

ABSTRACT OF THE DISCLOSURE

The invention relates to hot pressing of a plurality of optical elements of magnesium fluoride, zinc sulfide, calcium fluoride, zinc selenide, magnesium oxide, cadmium telluride, lanthanum fluoride, cadmium sulfide, zinc oxide, strontium fluoride, titanium dioxide, and cadmium selenide, by preliminary preparing the individual elements, applying a parting layer to each element, stacking the individual elements for plural hot fusion pressing to the resultant optical elements, as to prevent shifting of the individual elements during final fusion pressing.

This application is a continuation of application Ser. No. 596,230 dated Nov. 22, 1966 which has been abandoned.

The present invention relates to a novel method for hot pressing polycrystalline optical elements from powdered inorganic compounds, and more particularly to such a method for simultaneously producing a plurality of stacked optical elements. The invention is also concerned with the resulting stack of hot pressed optical elements as an article of manufacture.

For several years now infrared-transparent optical materials have been individually hot pressed from unconsolidated crystalline powder of inorganic compounds by subjecting the powder to a high temperature below the melting point, and a high mechanical pressure, while confined in a mold. Under suitable conditions of temperature and pressure it has been found possible to consolidate the powder to a density greater than 99% of the theoretical density of a single crystal of the same material, such that the resulting polycrystalline product is transparent to infrared rays, and usually is also transparent to visible light.

Generally the materials have been individually hot pressed to a thickness greater than that of the finally desired optical elements, and the resulting thick hot pressed blank has been sawed into several much thinner elements which are then finished to the desired size. For example, a hot pressed blank which is 6 inches in diameter and 0.5 inch thick can be sawed, rounded and polished to produce several pieces 0.1 inch thick. This technique has been applied to producing both flat discs and hollow dome-shaped elements. While the procedure has worked satisfactorily, it has certain disadvantages, among which are the high cost, and the long time and great effort required to subdivide the thick starting blank into thin elements for subsequent optical finishing. Furthermore, a substantial quantity of valuable material is lost in the kerf produced by the saw blade.

In accordance with the present invention a plurality of transparent polycrystalline optical elements approximating final shape and size are simultaneously hot pressed from unconsolidated crystalline powder of an inorganic compound by forming a stack of a plurality of loosely compacted blanks having less than 99% of the theoretical density, interspersed with layers of incompatible separator material between adjacent blanks. The resulting stack is then hot pressed in a mold cavity using a mechanically actuated plunger under such conditions of temperature and pressure that the blanks attain a density in excess of 99% of the theoretical and become transparent. After a suitable time in the mold the resulting stack is removed, and the individual elements having approximately the correct final thickness are thereafter separated from one another for final grinding and polishing operations, without the need for sawing thin slices as in the past.

The principles of this invention apply to any of the inorganic compounds which have been successfully hot pressed in the past, as exemplified by the following tabulation showing for each compound a published patent or an application (all assigned to Eastman Kodak Company like the present application) which describes the conditions for successful hot pressing (the disclosures being expressly incorporated by reference herein):

Magnesium fluoride, Canadian Pat. 646,436; zinc sulfide, U.S. Pat. 3,131,025; calcium fluoride, Canadian Pat. 701,845; zinc selenide, Canadian Pat. 688,568; magnesium oxide, U.S. Pat. 3,236,595, Canadian Pat. 731,706; Cadmium telluride, U.S. application Ser. No. 450,363 (now U.S. Pat. No. 3,475,116); lanthanum fluoride, U.S. Pat. 3,206,279; cadmium sulfide, Canadian Pat. 723,556; zinc oxide, Canadian Pat. 706,800; strontium fluoride, Canadian Pat. 727,530; titanium dioxide, U.S. application Ser. No. 517,937 (now Pat. 3,459,503); cadmium selenide, U.S. application Ser. No. 517,965 (now abandoned).

The specific optimum conditions of temperature, pressure and time are described in the above documents for each specific compound. However, in general it can be said that the temperature should be above 932° F. and the pressure above 9,500 p.s.i., for a period of time which can be readily established for any compound by a person having ordinary skill in this art.

The specific details of the invention will be described more in detail hereinafter having reference to the accompanying drawing wherein.

Figure 1:
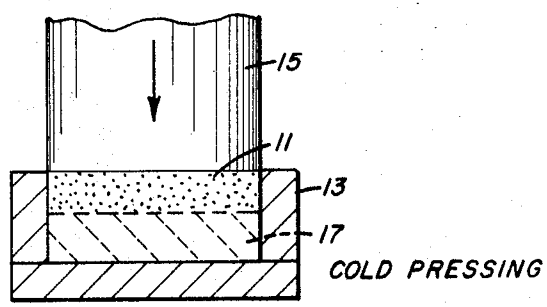
FIG. 1 is a schematic vertical sectional view, partly in elevation, through apparatus for initially cold pressing powder into blanks of less than 99% theoretical density, to be stacked and hot pressed subsequently.

Referring to FIG. 1, a mass 11 of unconsolidated powder of an inorganic compound selected from one of the compounds listed above is introduced into the cavity of a mold 13 and pressure is then applied by a plunger 15 which cold compresses the powder into a consolidated mass 17 in the form of a flat disc of much less thickness than the original mass of powder. The temperature can be room temperature or the mold can be heated to some extent, although there is no particular advantage in doing so. Instead of a single blank, several can be cold pressed at once in a mold having several cavities and cooperating plungers. The term cold pressing as used herein is intended to define an operation wherein the temperature is much less than the final hot pressing temperature so that the resulting blanks are not transparent, but opaque, and have a density much less than 99% of the theoretical.

Figure 2:
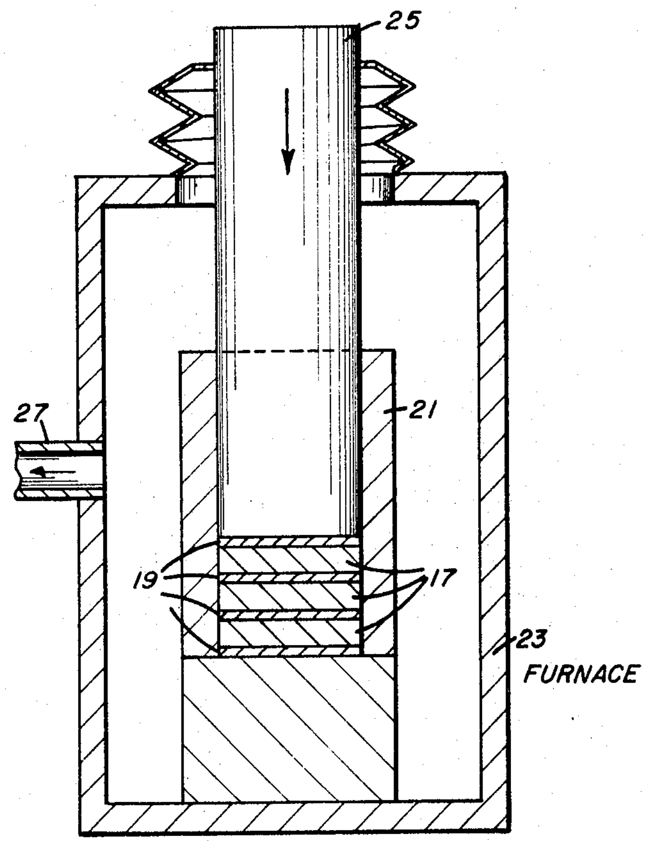
FIG. 2 is a schematic vertical sectional view through apparatus for hot pressing a stack of flat blanks.

This cold pressing operation is conducted quite rapidly, and the individual blanks as pressed are removed and then stacked in axial alignment for the hot pressing operation. In order to hot press the stack of blanks while preventing welding them together, thus preserving their individuality, a layer of incompatible separator material 19 is incorporated between adjacent blanks as shown in FIG. 2, and advantageously is also applied below the bottom blank and above the top blank to assure easy separation of the stack from the hot pressing apparatus. Then the stack is introduced into the cavity of a mold 21 within a furnace 23 which is electrically heated during the pressing operation.

A plunger 25 is applied to the top of the stack and suitable pressure is induced by downward movement of the plunger. It is usually desirable to maintain inert atmospheric conditions within the furnace 23, as by drawing a vacuum through a conduit 27, or by introducing an inert gas such as argon through the same conduit.

Alternatively, the stack can be built up within the mold cavity by alternately introducing separators and blanks into the cavity.

Figure 3:
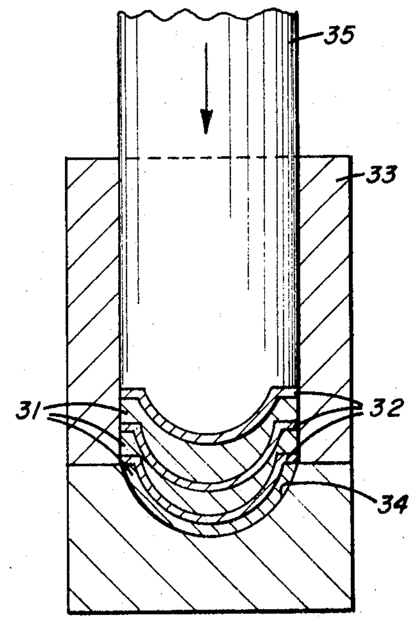
FIG. 3 is a schematic vertical sectional view through a part of the apparatus for hot pressing a stack of dome-shaped blanks.

FIG. 3 shows the same principles applied to a stack of cold pressed hollow dome-shaped blanks 31 interspersed with separators 32, which are positioned within a mold 33 having an upwardly concave bottom 34 and with the blanks themselves positioned in an upwardly concave position. Plunger 35 in this case has a convex end which mates with the mold for producing the desired dome shape.

The separators 19 and 32 can comprise any suitable material which will maintain the separation of the blanks and prevent them from adhering together at the high temperature and pressure of the operation. Among materials which can be used successfully are appropriately shaped discrete elements of such materials as metal, paper, and graphite. Among suitable metals are copper, molybdenum, titanium, and type 301 stainless steel. A decomposable material such as paper is effective because the carbonized residue maintains the separation. Ceramic materials such as sintered alumina also can be used, with or without the application of mold release agents thereto, such as Aquadag colloidal carbon suspension.

Instead of using discrete separators, the cold pressed blanks can be individually surface coated with a release agent such as Aquadag colloidal carbon suspension which is applied by spraying, painting or plating. This is especially advantageous for complex shapes such as hollow domes wherein the total volume of the noncompacted vs the compacted charge differs by a factor of four or five in an unsymmetrical fashion. Shaped separators of metal or the like are quite expensive for domes and are thus less desirable than surface coatings.

Instead of separately compacting the powder by cold pressing, the initial compacting is preferably accomplished in the same mold 13 or 33 in which the final hot pressing is accomplished. When flat discs are to be produced, the correct quantity of powder for one blank is introduced into mold 13 and then compacted by introducing a plunger which is manually activated to settle the powder down into a loosely compacted blank. Then a separator 19 is placed on top and another charge of powder is introduced on top of the separator and similarly compacted. These steps are repeated alternately until the desired size of stack is obtained. Then hot pressing is done as described above.

In still another preferred embodiment, the charges of powder are actually cold pressed in the hot pressing mold 13 or 33 by mechanically actuating the plunger 15, instead of the manual compaction described in the preceding paragraph. This is particularly desirable for hollow dome-shaped elements which are most advantageously separated from one another by a mold release agent such as a colloidal carbon suspension which is painted or sprayed on the top of each blank after it has been initially shaped.

Without the initial forming of loosely compacted blanks it is almost impossible to secure final hot pressed elements of the precise shapes and sizes required. Without this important step the discrete separators become canted in the mold and the final product is thicker on one side than others. When the separators are canted, moreover, the material of the several elements may come into contact and weld together. Additionally, when a surface coated separator material is used, a firm surface to which it can be applied is essential to formation of a continuous coating to preserve the separability of elements.

It is customary in hot pressing operations to coat all interior surfaces of the molds and the end of the plunger with a mold separation agent such as Aquadag colloidal carbon suspension. This practice is followed in the present invention.

Several specific examples of the method of the invention will be described below.

EXAMPLE 1

Magnesium fluoride discs 80 grams of magnesium fluoride powder having a fineness of minus 150 mesh is introduced into a cylindrical mold 13 having a diameter, of 3.6 inches and cold pressed at room temperature to a thickness of .300 inch at a pressure of 5,000 p.s.i. Nine of these cold pressed blanks are then stacked together and stainless steel separator discs .010 inch thick are positioned between each pair of blanks. Similar discs are applied to the bottom of the mold 21, and to the top of the stack.

The furnace 23 is heated to 1300° F. and the plunger 25 applies a pressure of 30,000 p.s.i. against the stack of blanks. A vacuum is pulled through the line 27, and the hot pressing conditions are maintained for 30 minutes, after which argon is introduced through the line 27 and the furnace is allowed to cool to room temperature.

The stack of blanks is then removed. The individual blanks are separated from one another and from the separators 19 when subsequent finishing operations are to be performed.

EXAMPLE 2

Magnesium fluoride domes

Four domes of magnesium fluoride 3 inches in diameter are formed by cold pressing at 5,000 p.s.i. successive 200 gram charges of powder in the mold 33, with the top of each blank being painted with a layer of Aquadag colloidal carbon suspension after withdrawal of plunger 35 and before introducing the next charge of powder.

After the top of the last blank has been painted, the plunger is reintroduced, the furnace and contents are heated to 1300° F. and a mechanical pressure of 30,000 p.s.i. is applied for 30 minutes while drawing a vacuum in the furnace. The furnace is then allowed to cool down, the vacuum is broken by introducing argon, and then the stack of domes is separated from the mold by removing the cylindrical portion of the mold. Then the individual domes are separated from one another for appropriate finishing operations.

EXAMPLE 3

Zinc sulfide discs

Using the apparatus of FIG. 2, two 6½ inch diameter zinc sulfide discs are formed by cold pressing at 3000 p.s.i. successive 500 gram charges of minus 200 mesh zinc sulfide powder in the mold 21, with the top of the first blank being painted with Aquadag colloidal carbon suspension after withdrawing the plunger and before introducing the second powder charge.

After the second powder charge has been cold pressed, and without withdrawing the plunger from the mold, the furnace and contents are heated to 1650° F. and allowed to soak 1 hour. Then a pressure of 30,000 p.s.i. is applied and maintained for 1 hour while a vacuum is maintained. Then the furnace is cooled down, argon introduced, and the hot pressed discs are removed and separated from one another.

EXAMPLE 4

Calcium fluoride discs

Using the apparatus of FIG. 2, three 7-inch diameter discs of calcium fluoride are formed by compacting with a manually actuated plunger, successive 500 gram charges of minus 60 mesh powder. Solid graphite separator discs ¼ inch thick are placed on top of the first and second blanks after compaction.

Then the plunger 25 is introduced into the mold, the furnace and contents are heated to 1600° F. and a pressure of 30,000 p.s.i. is applied immediately thereafter and held for 1 hour.

The furnace is then cooled down, the vacuum broken by argon, and then the stack of elements is removed by first removing the cylindrical portion of the mold from the stack. The individual elements are then easily separated from one another and from the graphite discs.

EXAMPLE 5

Zinc selenide discs

Two 7 inch diameter discs of zinc selenide are formed by introducing a ¼ inch thick graphite disc on the bottom of mold 21, introducing a 1000 gram charge of minus 200 mesh zinc selenide powder into the mold on top of the disc, compacting the powder by manual actuation of a plunger, adding a second graphite disc to the top of the first charge, repeating with a second 1000 gram charge, adding a third graphite disc, and then introducing plunger 25 into the mold on top of the top graphite disc.

The furnace and contents are then heated to 2200° F., allowed to soak 1 hour, and then a mechanical pressure of 25,000 p.s.i. is applied and held for 30 minutes.

Subsequent handling follows the previous examples.

EXAMPLE 6

Lithium fluoride doped magnesium oxide

Four successive 100 gram charges of minus 200 mesh powdered magnesium oxide containing 1% of lithium fluoride are cold pressed at 3,000 p.s.i. in a 3 inch diameter mold 21, Aquadag colloidal carbon suspension being painted as a layer on top of each blank. Additionally graphite discs ¼ inch thick were placed on top of the bottom of the mold (below the first blank), and on the top of the top blank.

Then the furnace and contents are heated to 1600° F. and allowed to soak 5 minutes, after which a pressure of 20,000 p.s.i. is applied for 1 hour.

Subsequent steps are as in the previous examples.

EXAMPLE 7

Cadmium telluride

Two successive charges of 150 grams of cadmium telluride powder, minus 200 mesh, are cold pressed at 5,000 p.s.i. in a 4 inch diameter mold 21, a molybdenum disc 4 inches in diameter and .020 inch thick coated on both side with Aquadag colloidal carbon suspension being applied to the top of the first blank before the second charge is introduced.

Then the blanks are hot pressed by heating furnace and contents to 1450° F., soaking 15 minutes, and then applying a pressure of 25,000 p.s.i. for 30 minutes.

Subsequent steps repeat the other examples.

The invention has been described in detail with particular reference to preferred embodiments thereof, but it will be understood that variations and modifications can be effected within the spirit and scope of the invention as described hereinabove and as defined in the appended claims.

I claim:

1. A method for simultaneously producing a plurality of infrared transparent polycrystalline optical elements from unconsolidated crystalline powder of an inorganic compound selected from the group consisting of magnesium fluoride, zince sulfide, calcium fluoride, zinc selenide, magnesium oxide, cadmium telluride, lanthanum fluoride, cadmium sulfide, zinc oxide, strontium fluoride, titanium dioxide, and cadmium selenide, said method comprising cold pressing from said powder a plurality of loosely compacted opaque blanks having a density much less than 99% of the theoretical; arranging said opaque blanks in a stack; providing a layer of non-compatible separator material between each pair of adjacent blanks; hot pressing said stack of blanks under such conditions of superatmospheric temperature and mechanical pressure that said blanks attain a density in excess of 99% of the theoretical and become infrared transparent, said temperature being above 932° F., but below the melting point, and said pressure being greater than 9500 p.s.i.; and separating the resulting individual elements from one another.

2. A method in accordance with claim 1, wherein said blanks are both cold pressed and then hot pressed in the shape of hollow domes.

3. A method in accordance with claim 1, wherein said layer of separator material is provided by applying a colloidal suspension of carbon to the surfaces of said cold pressed blanks.

4. A method in accordance with claim 1, wherein said layer of separator material is provided as a shaped discrete element.

5. A method in accordance with claim 1 wherein said loosely compacted opaque blanks are formed by separately cold pressing said powder, then transferring said blanks to a mold, arranging said blanks in such a stack in said mold with said separator material between each pair of adjacent blanks, and then hot pressing said stack of blanks in said mold.

6. A method in accordance with claim 1 wherein said loosely compacted opaque blanks are formed by introducing successive charges of such powder into a mold, successively cold pressing said charges, introducing said layer of separator material on top of each charge after cold pressing thereof and before introducing the next powder charge thereon, and then hot pressing said stack of blanks in said mold.

References Cited

UNITED STATES PATENTS

| | | | |
|---|---|---|---|
| 1,918,064 | 7/1933 | Taylor | 264—332 |
| 2,795,084 | 6/1957 | Littleton | 65—24 |
| 3,116,137 | 12/1963 | Vasilus et al. | 65—18X |
| 3,208,839 | 9/1965 | Nordberg | 65—24 |
| 3,408,430 | 10/1968 | Lachman | 65—18 |
| 2,246,463 | 6/1941 | Garratt | 65—26X |
| 3,347,650 | 10/1967 | Barkhau | 65—26 |

FRANK W. MIGA, Primary Examiner

U.S. Cl. X.R.

65—24, 32, 33, 39, 306; 264—1, 332